(12) United States Patent
Kun

(10) Patent No.: US 8,800,452 B2
(45) Date of Patent: Aug. 12, 2014

(54) RAILROAD FREIGHT CAR LOADING OR UNLOADING

(71) Applicant: David Kun, Federal Way, WA (US)

(72) Inventor: David Kun, Federal Way, WA (US)

( * ) Notice: Subject to any disclaimer, the term of this patent is extended or adjusted under 35 U.S.C. 154(b) by 0 days.

(21) Appl. No.: 13/679,882

(22) Filed: Nov. 16, 2012

(65) Prior Publication Data

US 2013/0139719 A1   Jun. 6, 2013

Related U.S. Application Data

(63) Continuation-in-part of application No. 13/105,897, filed on May 12, 2011, which is a continuation-in-part of application No. 12/777,278, filed on May 11, 2010, now abandoned, and a continuation-in-part of application No. 12/779,841, filed on Jul. 7, 2010, now abandoned, and a continuation-in-part of application No. 12/832,054, filed on Jul. 7, 2010, now abandoned.

(51) Int. Cl.
*E01B 7/00* (2006.01)
*B61D 47/00* (2006.01)
*B61D 3/18* (2006.01)
*B65G 63/00* (2006.01)

(52) U.S. Cl.
CPC . *B61D 3/184* (2013.01); *E01B 7/00* (2013.01); *B61D 47/005* (2013.01); *B65G 63/004* (2013.01)
USPC ................................. 104/130.01; 104/130.11

(58) Field of Classification Search
USPC .......... 104/130.01, 130.07, 130.06, 262, 264, 104/268, 294, 130.11; 198/787, 782
See application file for complete search history.

(56) References Cited

U.S. PATENT DOCUMENTS

| | | |
|---|---|---|
| 2,043,134 A | 6/1936 | Wanamaker |
| 2,753,811 A | 7/1956 | Walker |
| 2,826,155 A | 3/1958 | Larsson |
| 2,920,580 A | 1/1960 | Williams |
| 3,130,688 A | 4/1964 | Gutridge et al. |
| 3,442,404 A | 5/1969 | Pioch |
| 3,640,410 A | 2/1972 | Pioch |
| 3,991,889 A | 11/1976 | Cox |
| 4,124,129 A | 11/1978 | Barry |
| 4,190,393 A | 2/1980 | Landow |

(Continued)

FOREIGN PATENT DOCUMENTS

| | | |
|---|---|---|
| CN | 20133053 Y | 10/2009 |
| EP | 0400052 B1 | 4/1995 |
| GB | 2270663 A | 3/1994 |

*Primary Examiner* — Mark Le
(74) *Attorney, Agent, or Firm* — R. Reams Goodloe, Jr.

(57) ABSTRACT

A rail-road intermodal freight system. In an embodiment, a plurality of L-cars are provided. In an embodiment, each L-car may be configured for support at its forward end on a preceding L-car, and at a rear base on a set of flanged rail wheels. In implementing the system, a freight yard is provided with rail components which are switchable to enable decoupling and a turn-in-place operation, wherein each care is lifted from the preceding L-car in the train, and the neck portion of the L-car lowered to the ground. When in the lowered position, downwardly extending legs on the over-the-road trailer enable an over-the-road tractor to attach the over-the-road trailer in conventional fashion, for removal of the over-the-road tailer from the L-car. Loading of an over-the-road trailer on the L-car takes place via a reverse process, wherein the trailer is backed up on to the L-car.

6 Claims, 9 Drawing Sheets

(56) References Cited

U.S. PATENT DOCUMENTS

| | | |
|---|---|---|
| 4,258,628 A | 3/1981 | Altherr |
| 4,425,064 A | 1/1984 | Walda et al. |
| 4,685,399 A | 8/1987 | Baker |
| 4,746,257 A | 5/1988 | Barry |
| 4,751,882 A | 6/1988 | Wheatley et al. |
| 4,792,269 A | 12/1988 | Engle |
| 4,817,537 A | 4/1989 | Cripe et al. |
| 4,917,020 A | 4/1990 | Wicks et al. |
| 4,922,832 A | 5/1990 | Lienard et al. |
| 4,938,151 A | 7/1990 | Viens |
| 5,067,872 A | 11/1991 | Engle |
| 5,246,321 A | 9/1993 | Hesch |
| 5,341,746 A | 8/1994 | Theurer et al. |
| 5,343,812 A | 9/1994 | Ishida |
| 5,421,687 A | 6/1995 | Wayman |
| 5,511,923 A | 4/1996 | Dunstan |
| 5,622,115 A | 4/1997 | Ehrlich et al. |
| 5,826,517 A | 10/1998 | Larson et al. |
| 5,873,593 A | 2/1999 | Gesuale |
| 5,901,649 A | 5/1999 | Hathaway et al. |
| 5,988,073 A | 11/1999 | Eriksson |
| 6,240,853 B1 | 6/2001 | Kassab |
| 6,309,153 B1 | 10/2001 | Petzitillo, Jr. et al. |
| 6,352,400 B1 | 3/2002 | Forbes |
| 6,736,071 B2 | 5/2004 | Engle |
| 6,968,788 B1 | 11/2005 | Coslovi |
| 7,302,894 B2 * | 12/2007 | Belanger et al. .............. 104/242 |
| 2003/0183119 A1 | 10/2003 | Hathaway et al. |
| 2004/0213652 A1 | 10/2004 | Campbell et al. |
| 2006/0260503 A1 | 11/2006 | Jeunehomme et al. |
| 2008/0129827 A1 | 6/2008 | Morino |
| 2008/0141895 A1 | 6/2008 | Lanigan et al. |
| 2008/0166211 A1 | 7/2008 | Lanigan et al. |
| 2008/0213073 A1 | 9/2008 | Benedict et al. |
| 2009/0003985 A1 | 1/2009 | Lanigan, Sr. et al. |
| 2009/0238669 A1 | 9/2009 | Hathaway et al. |
| 2009/0293756 A1 | 12/2009 | Hathaway et al. |
| 2010/0021257 A1 | 1/2010 | Hall et al. |

\* cited by examiner

FIG. 1
FIG. 2
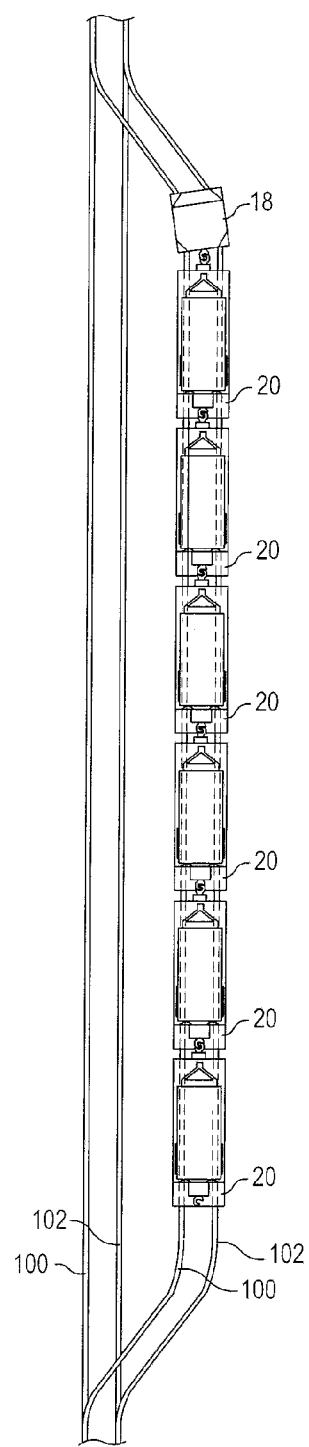
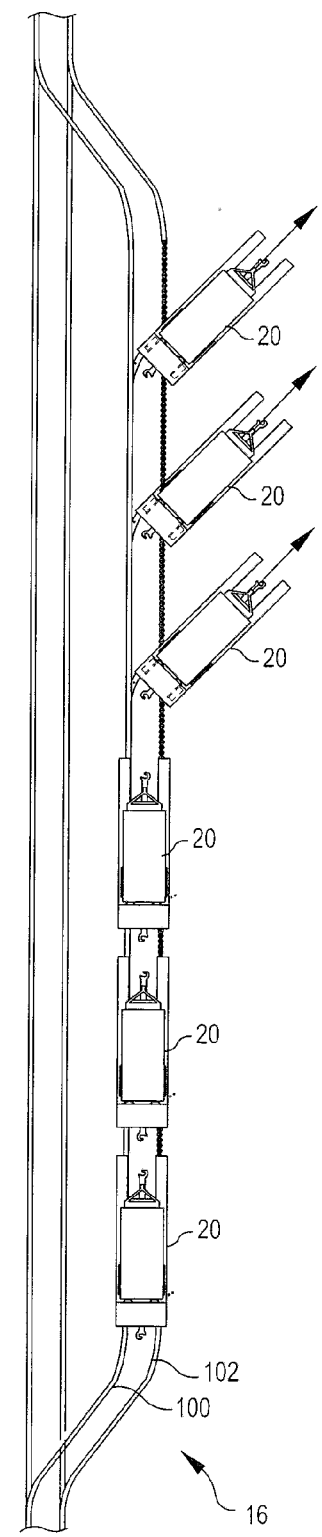

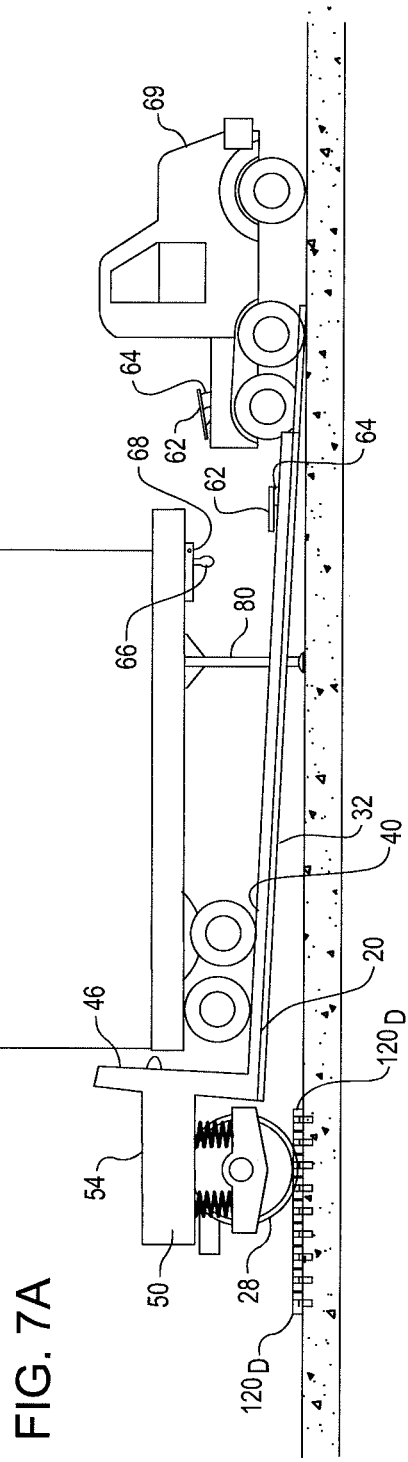

RAILROAD FREIGHT CAR LOADING OR UNLOADING

RELATED PATENT APPLICATIONS

This application claims priority, and is a continuation-in-part from currently pending U.S. patent application Ser. No. 13/105,897, filed May 12, 2011, which application claimed U.S. domestic priority and was (a) a continuation-in-part of prior pending U.S. patent application Ser. No. 12/777,278, filed on May 11, 2010, (b) a continuation-in-part of prior pending U.S. patent application Ser. No. 12/779,841, filed on Jul. 7, 2010, and (c) a continuation-in-part of prior pending U.S. patent application Ser. No. 12/832,054, filed on Jul. 7, 2010. The disclosures of each of the aforementioned patent applications, including their specification, claims, and drawing figures, are hereby incorporated herein by this reference.

STATEMENT OF GOVERNMENT INTEREST

Not Applicable.

COPYRIGHT RIGHTS IN THE DRAWING

A portion of the disclosure of this patent document contains material that is subject to copyright protection. The patent owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This application relates to a system for rail-road transfer of over-the road shipping containers, and to railroad track developments which facilitate such transfers.

BACKGROUND

In the freight shipping business, it is well known that in many situations, the transfer of highway trailers by rail car may save money, and in many instances, may save transit time from a point of origin to a final destination. However, loading of highway capable freight trailers on to rail cars, and the unloading of such trailers from rail cars is a rather labor intensive and time consuming activity. For example, a switch engine is often used at a rail yard to position rail cars to a loading platform accessible to tractors for the trucks. As a result, the use of rail-road intermodal systems has largely been limited to rather long distance freight hauls. However, in an ever more competitive shipping cost environment, there remains a need for improvements and cost saving. More particularly, on "short" or "medium" haul lengths, say 200 to 400 miles, where the use of rail systems might completely avoid the need for long haul drivers for large numbers of tractor-trailer combinations use of a new rail-to-road intermodal system would be desirable. Thus, it would be advantageous if novel, cost effective methods were available, along with novel apparatus for implementation of such methods, for improving economics of rail-road freight transfer.

BRIEF DESCRIPTION OF THE DRAWING FIGURES

The present invention will be described by way of exemplary embodiments, illustrated in the accompanying drawing figures in which like reference numerals denote like elements, and in which:

FIG. 1 shows a rail siding as at time of arrival to an intermodal transfer station, of a plurality of L-cars (in a series of L-cars from 1 to N, N being a positive integer, and wherein N=1 refers to the first L-car in a plurality of L-cars) in a rail train made up of a plurality of specialized rail cars for carriage of over-the road trailers.

FIG. 2 shows a rail siding as at a time during which L-cars in a railroad train are being turned for pickup of the over-the-road trailers by an over-the-road tractor, for removal from the rail yard.

Figure 3:
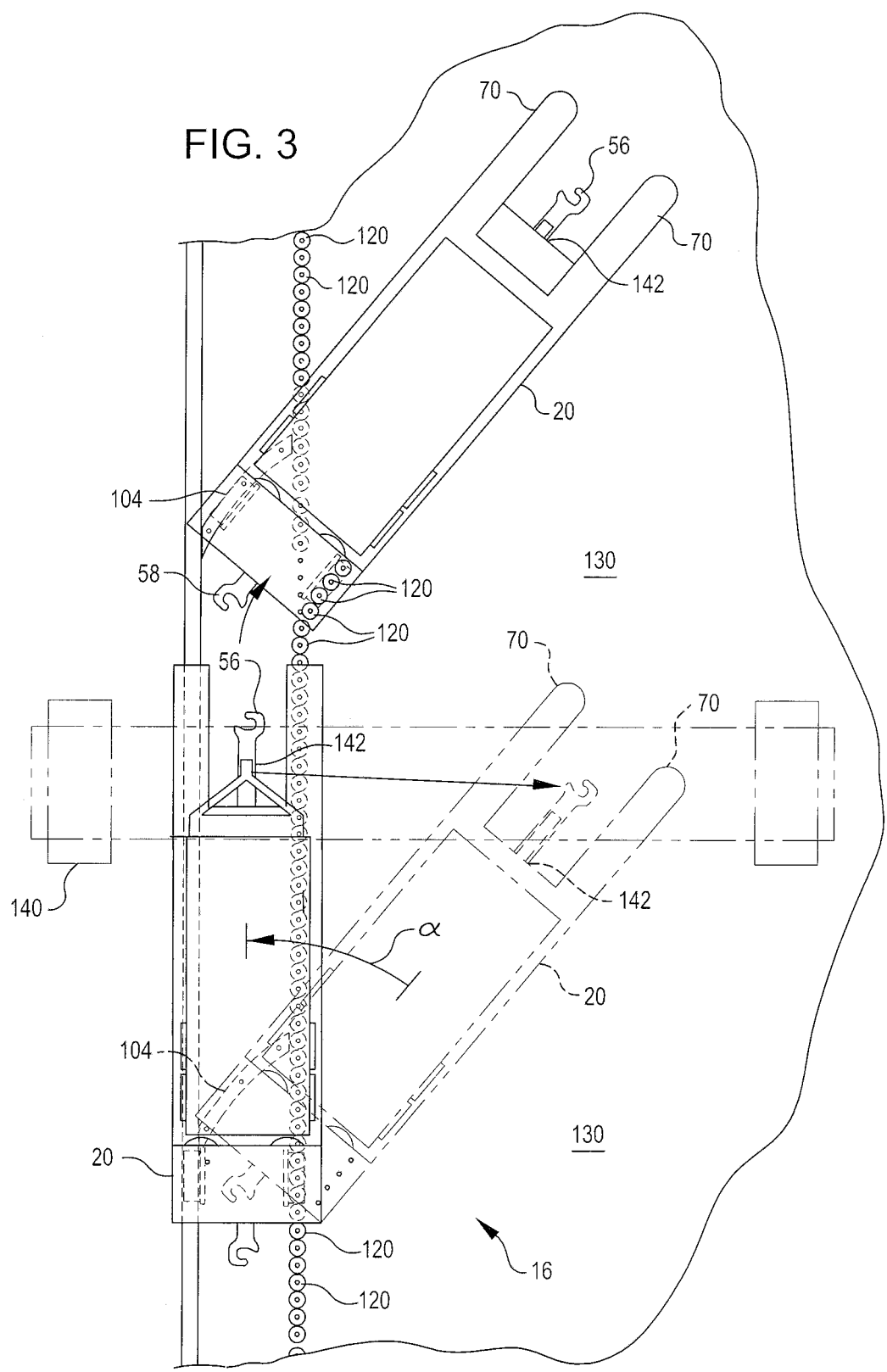

FIG. 3 shows a rail siding as at a time during which L-cars in a railroad train are being turned for hookup of the over-the-road freight trailers with an over-the-road tractor, for removal from the rail yard, now further illustrating use of novel rail sections, and interchangeable rail forming discs, all of which facilitate the angular movement of an L-car to a position for off-load from the rail car of an over-the-road trailer.

Figure 4:
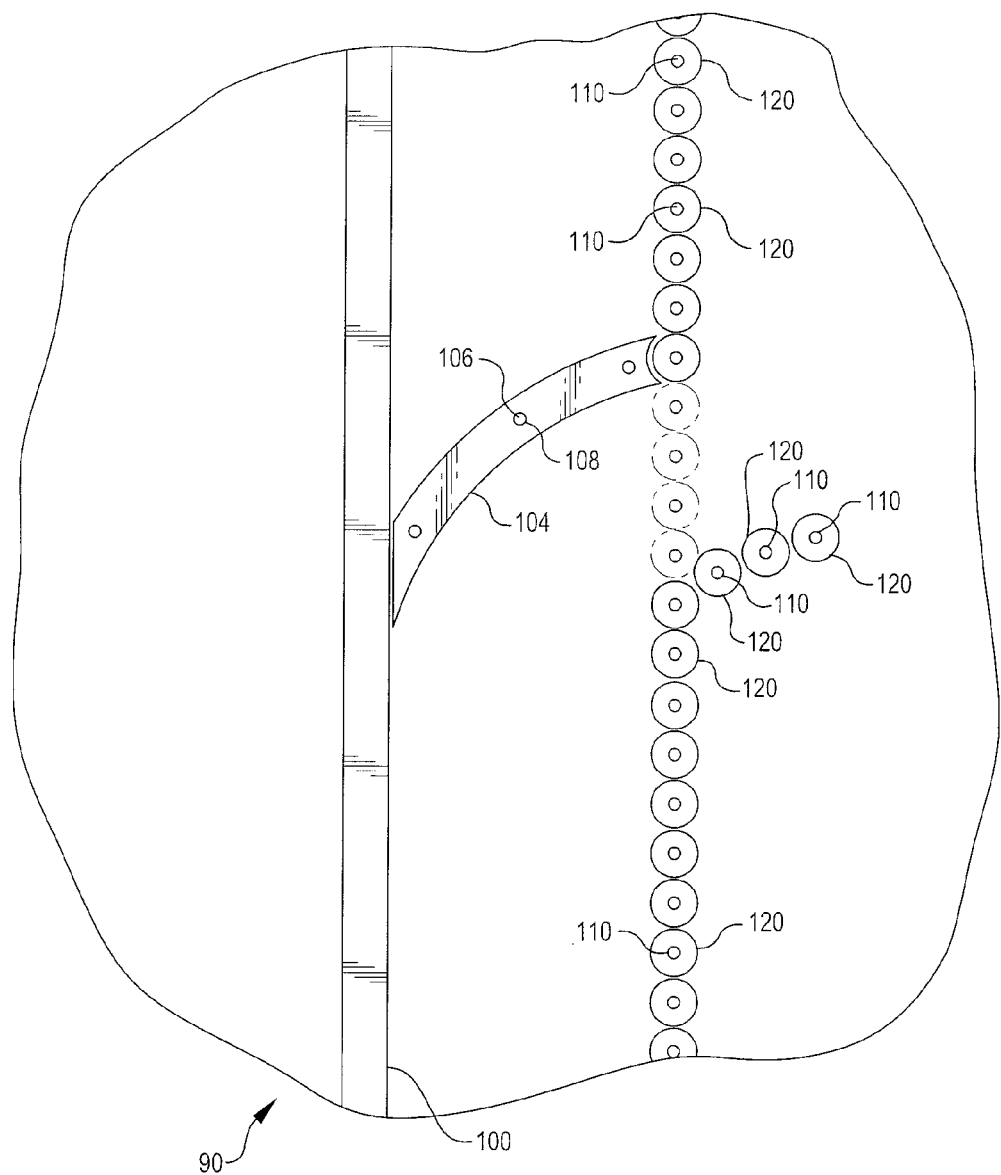

FIG. 4 shows details for an embodiment of a rail siding as at a time during which L-cars in a railroad train are being turned for pickup, here showing in detail the use of novel rail sections, and interchangeable rail forming discs, all of which facilitates the angular movement of an L-car to a position for off-load of an over-the-road trailer from the L-car.

Figure 5:
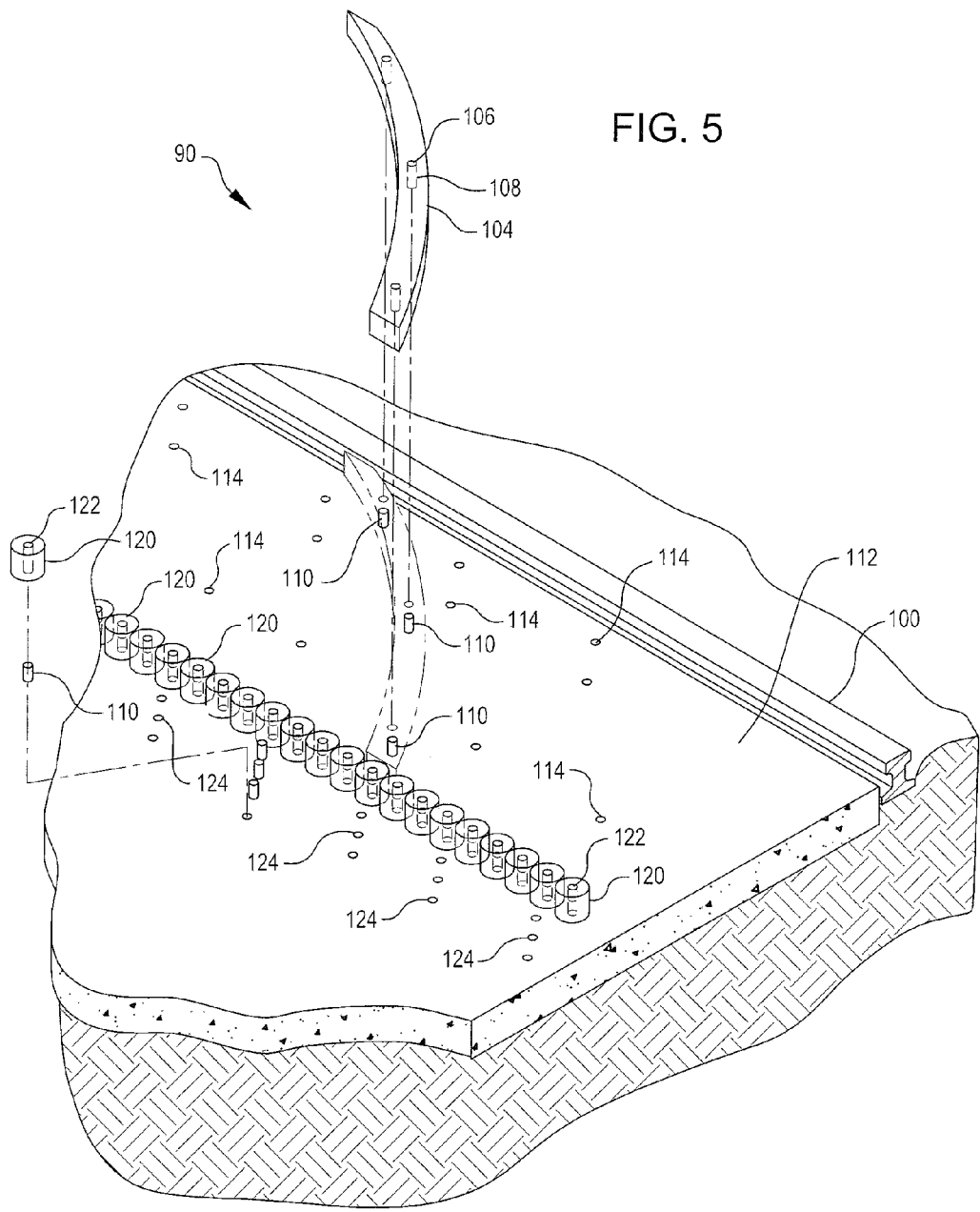
Figure 5A:
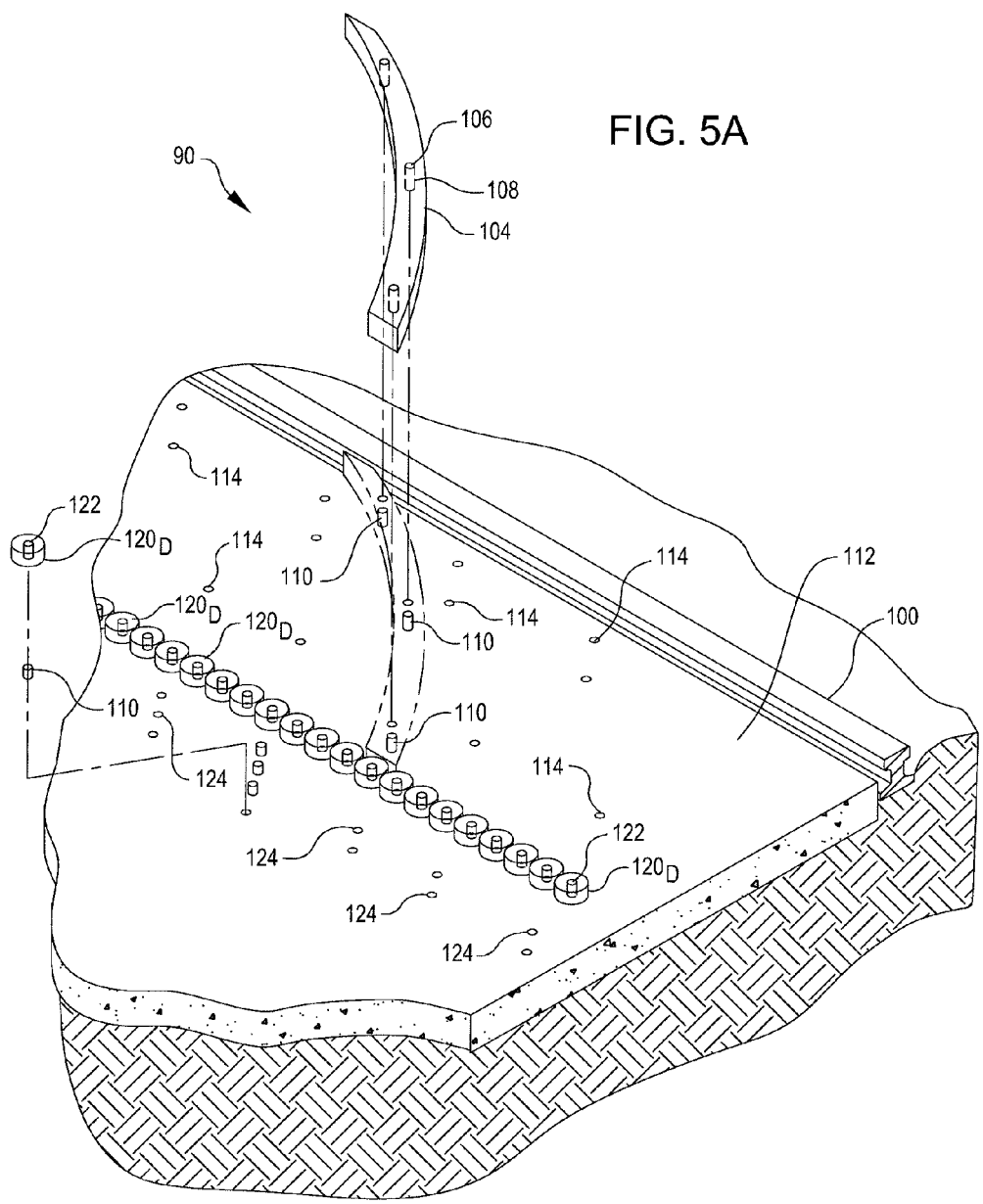

FIG. 5 shows yet further details for an embodiment of a rail siding as at a time during which L-cars in a railroad train are being turned for pickup, here showing in additional detail the use of novel rail sections, and interchangeable rail discs, all of which facilitates the angular movement of an L-car to a position for off-load of an over-the-road trailer from the L-car. FIG. 5A is similar to FIG. 5, and is provided to illustrate another embodiment for the interchangeable rail discs that provide structural support for flanged wheels on rail cars.

Figure 6:
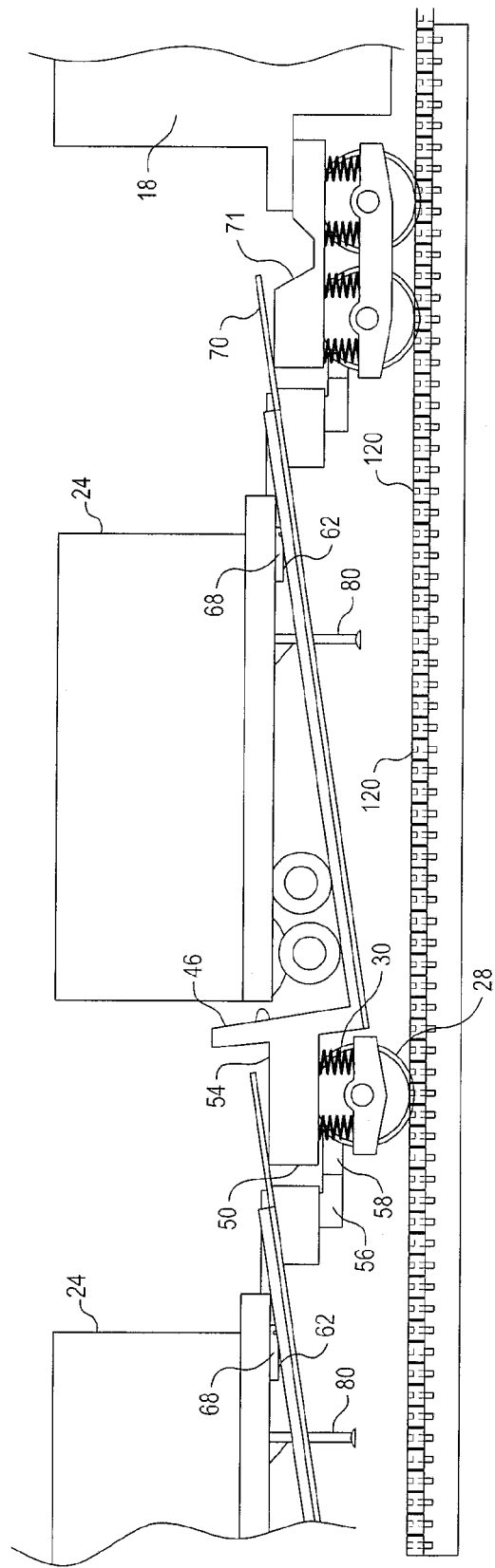

FIG. 6 shows details for embodiment an L-car system for rail travel of rail-road intermodal freight, here illustrating the use of a dolly at a first L-car (N=1) on a train made up of L-cars, where the dolly supports a first L-car for connection to a locomotive, and wherein a second L-car (N=2) is joined by coupling to the first L-car (N=1).

Figure 7:
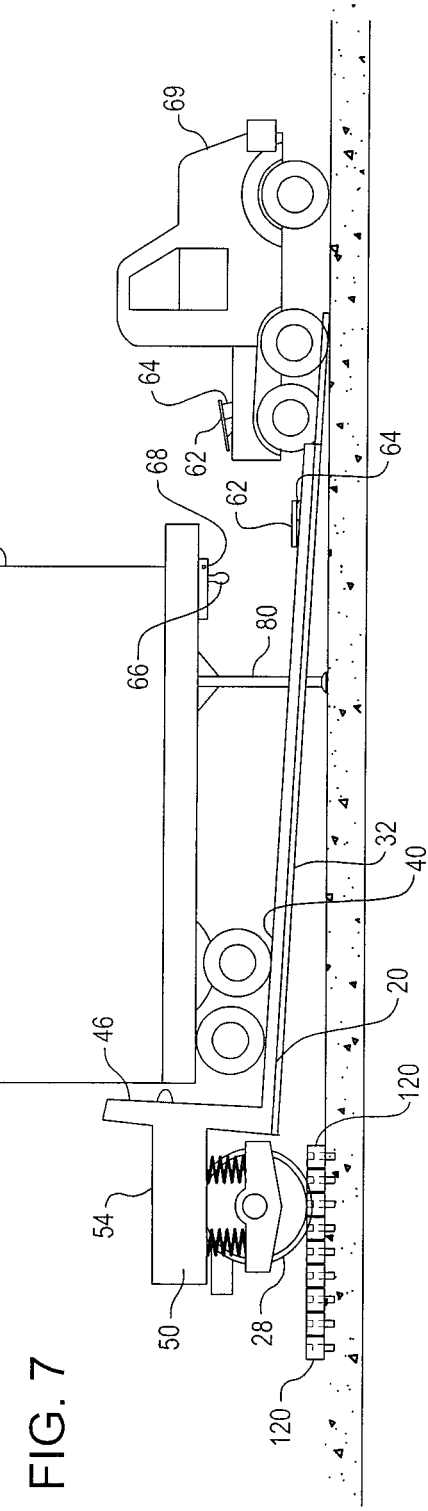

FIG. 7 shows yet further details for an embodiment of a L-car for use in transport of over-the-road trailers, now illustrating the pick-up of an over-the-road trailer by a tractor, with the L-car in its lowered, trailer pickup position. FIG. 7A is similar to FIG. 7, and is provided to illustrate another embodiment for the interchangeable rail discs that provide structural support for flanged wheels on rail cars.

Figure 8:
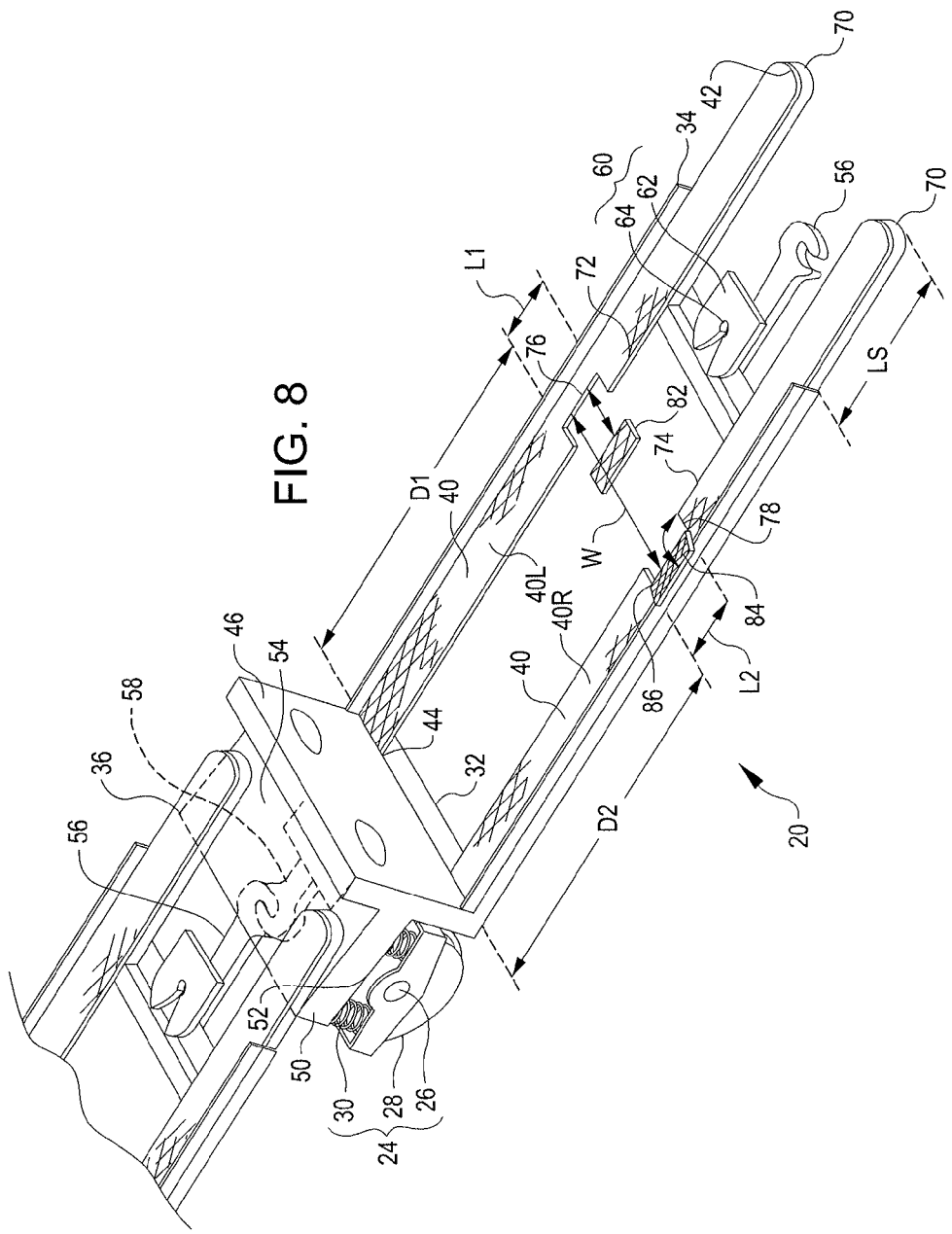

FIG. 8 shows yet further details for an embodiment of a L-car for use in transport of over-the-road trailers, now illustrating the L-car in empty configuration, ready for loading of an over-the-road trailer.

The foregoing figures, being merely exemplary, contain various elements that may be present or omitted from actual apparatus that may be constructed, or used to practice the methods taught herein, and to manufacture an L-cars including features set forth herein. An attempt has been made to draw the figures in a way that illustrates at least those elements that are significant for an understanding of the apparatus and methods taught herein, and for the alternate configurations thereof, and for a method for use of the apparatus. However, various other elements for such L-cars, and methods of use thereof, may be utilized, within the teachings hereof and within the coverage of the claims set forth herein.

DETAILED DESCRIPTION

Unique designs for rail cars for use in rail-road intermodal freight systems are set forth herein. Also, methods for use of such devices are described herein. Many of the illustrations provided are directed at the most common trailer design seen in over-the-road applications in North America, namely, a semi-trailer. By definition, a semi-trailer is a trailer without a front axle. In semi-trailers, a large proportion of the weight in the semi-trailer is supported by an over-the-road tractor. Semi-trailers are normally equipped with landing gear, namely legs which can be lowered, to support the semi-trailer when it is detached from the road tractor. In many parts of the world, a road tractor coupled to a semi-trailer is known as a semi-trailer truck or more commonly, simply as a "semi". However, it should be understood that the basic L-car system described herein may be applied to other types of trailers, including those having a front axle and attachment tongue and hitch (such as an A-frame mount seen in FIGS. 1 and 2), and thus the intermodal system design described herein should not be limited to semi-trailers per se, but should be understood to be useful in the quick loading and unloading of many over-the-road trailer designs.

Attention is directed to FIGS. 1 and 2, where a rail car 20 for carriage of over-the-road trailers 22 is depicted. As seen in FIG. 1, a set of rail cars 20 has been pulled on to a siding 16 by engine 18. Further, see FIG. 3 wherein rail car 20 is shown carrying an over-the-road semi-trailer 24, all as just discussed above. As further detailed in FIG. 8, the rail car 20 includes a wheel set 24 having at least one axle 26 connected to a pair of flanged rail wheels 28, and a suspension package 30 such as conventional springs. A frame 32 is provided, wherein the frame is generally L-shaped, with a front end 34 and a rear end 36. The frame further includes a deck 40 for support of a trailer 22 or 24. The deck may extend between a first end 42 and a second end 44. In an embodiment, a deck 40 may be adapted to slope downward toward the second end 44 during rail transit operation. In an embodiment, a generally vertically extending bumper 46 may be located at or adjacent the second end 44 of the deck 40. A rear base 50 may be provided, located rearward of the bumper 46. In an embodiment, a rear base 50 may have (a) a lower side 52 resting on and suspended by the suspension package 30, and (b) and an upper side 54. Further, in an embodiment a conventional railroad front coupler 56 and rear coupler 58 may be provided. In various embodiments, a lock 60 may be provided, in order to securing a trailer 22 or 24 to the rail car 20. As may be further understood with reference to FIG. 7, and as described elsewhere herein, in an embodiment, a lock 60 may include a fifth wheel sliding plate 62 with spring loaded clamping jaws 64 that act on a king pin 66 located at an upper mating plate 68 on semi-trailer 24, all of which are adapted to lock the king pin 66 to secure the semi-trailer 24. Tractor 69 may be similarly equipped with fifth wheel type sliding plate 62 and clamping jaws 64 of conventional manner.

In various embodiments, a rail car 20 may be provided with one or more support members 70. Such support members 70 may extend forward of the frame 32, with sufficient length LS sufficient to reach an upper side 54 of a rear base 50 of a next forward rail car 20 in a set of N rail cars, wherein N is a positive integer greater than one. As noted in FIG. 6, at a first car 20, the support members 70 may rest on a connecting dolly 71, which provides for attachment to engine 18. In an embodiment, two support members 70 may be provided.

As also seen in FIG. 8, a deck 40 may include a left track portion 40L and a right track portion 40R. The left 40L and right 40R track portions are sized and shaped for support of a trailer 20 or 24 having conventional dual left wheels and dual right wheels.

As also may be appreciated from FIG. 8, the left track portion 40L has a first inner edge 72, and the right track portion has a second inner edge 74. The first inner edge 72 and the second inner edge 74 define a gap between the left track portion 40L and the right track portion 40R. In some embodiments, a rail car 20 may be further configured for transport of a semi-trailer having landing gear. In such cases, the first inner edge 72 further comprises a first outwardly protruding cutout 76 a distance D1 forward from the bumper 46 that defines a narrowed length L1 of the left track portion 40L. Also, the second inner edge 74 further comprises a second outwardly protruding cutout 78 a distance D2 forward from the bumper 46 that defines a narrowed length L2 of the right track portion 40R. The first outwardly protruding cutout 76 and the second outwardly protruding cutout 78 may be sized and shaped to provide sufficient width W for passage through said deck of landing gear 80 of a selected semi-trailer. In an embodiment, the rail car 20 may be further provided with a first deck insert 82 corresponding to the size and shape of the first outwardly protruding cutout 76, and a second deck insert 84 corresponding to the size and shape of said second outwardly protruding cutout 78. In an embodiment, a first deck insert 82 may be hinged to the left track portion (not shown, but similar to below), and the said second deck insert 84 may be hinged at hinge 86 to the right track portion 40R.

Turning now to FIGS. 3, 4 and 5, components for an apparatus 90 to support of a pair flanged rail wheels when the pair of flanged rail wheels are abruptly turned from first and second straight rails are illustrated. As noted in FIGS. 1 and 2, the rail car 20 may be configured for transport over a conventional pair of first 100 and second 102 rails. However, in order to turn a rail car 20 abruptly for off-load and on-load of trailers 22 or semi-trailers 24, I have developed a concept that may be useful. In particular, as shown in FIG. 4, a curved rail section 104 may be provided. Such a curved rail section 104 may be sized and shaped to curve sharply from a first straight rail 100. The curved rail section 104 further includes a plurality of pin accepting apertures 106 defined by inner edge portions 108. A plurality of pins 110 is provided, as noted in FIG. 5. A base plate 112 may be provided having a plurality of pin locating apertures 114 therein. The plurality of pin accepting apertures 106 are adapted for accepting pins 110 therethrough to secure the curved rail section 104 at the pin locating apertures 114 in the base plate 112.

In an embodiment, the apparatus 90 may further include a plurality of rail forming tubular cylinders 120. The rail forming tubular cylinders 120 have pin 110 accepting apertures 122. The rail forming tubular cylinders 120 are sized and shaped for rolling support of a flanged rail wheel 28 by placement of a plurality of rail forming tubular cylinders 120 above the base plate 112, wherein a flat surface of a tubular cylinder vertically supports a flanged rail wheel 28. A plurality of pin accepting apertures 122 are adapted for accepting pins 110 therethrough to secure the rail forming tubular cylinders 122 at suitable pin locating apertures 124 in the base plate 114. In an embodiment, the rail forming tubular cylinders 120 may be provided with the tubular cylindrical shape in a vertical orientation, so that the tubular cylinder structure vertically supports flanged wheels on intermodal freight rail cars.

Now that components for various embodiments of an exemplary rail car 20 and curved track portions 104 and rail discs 120 have been described, various components for methods of use of the same for rapid loading and unloading of trailers 22 or 24 from rail cars 20 will be described. First, a plurality of rail cars 20 as described herein may be provided. Then, a plurality of over the road trailers, either semi-trailers 24 or trailers 22, all as noted above are provided. Then, a suitable rail siding 16 must be provided. As noted in FIG. 3, at rail siding 16, there must be space 130 for storage for the plurality of rail cars 20 when the plurality of rail cars 20 are turned to a spaced apart angled configuration by an angle alpha, each rail car 20 spaced apart from adjacent rail cars. Further, the storage space 130 should be accessible as a roadway by tractors 69. As seen in FIG. 3, a lift 140 may be provided. Lift 140 may be of conventional fashion as used for lifting containers, however, lifting requirements in most instances may be considerably less, so energy savings may be possible by using lifting mechanism, such as a wheeled lifting device, more closely matched with actual loads. In any event, lift 140 is used to lift at least one end of each of the rail cars 20, one after the other. To start, a first (N=1) rail car 20 is lifted at a front end 142, to turn the rail car 20 and place the rail car at a selected angle alpha away from a track 100 and 102. Then, the front end 142 of the rail car 20 is lowered to the ground, so that the deck 40 of the rail car 20 is accessible to a tractor 69. Then the trailer 22 or 24 is removed from the rail car 20 using the tractor 69.

In an embodiment, the method may be used for over-the-road trailers and are of the semi-trailer 24 type having extended landing gear 80. In such cases, the method may further release the lock 60 before lowering the front end 142 of the rail car 20 to the surface 130. The method may be reversed for loading a semi-trailer 24 on to a rail car 20 using a tractor 69. In the case of loading of a semi-trailer, then the landing gear 80 is lowered before unhooking the tractor 69, and the landing gear 80 may remain in a lowered configuration during rail transport. The semi-trailer 24 may be locked in place on the rail car 20 at time of lifting of the rail car 20 to return it to the track, or may be performed earlier, for example, by use of a forklift (not shown) to temporarily lift the rail car. In any event, the rail car 20 lock 60 is locked to the mating plate 68 and king pin 66 on the trailer 24. Each rail car 20 is in turn lifted and turned to return each rail car 20 in-line with track 100 and 102 direction.

In an embodiment, the support members 70 may rest on the upper side 54 of the rear base 50 of the rail car 20. In an embodiment, the curved rail section 104 and rail forming discs 120 may be utilized, all in the manner set forth above, to prepare temporary track for abrupt turning of a rail car 20, by setting the curved rail section 104 and setting a plurality of rail forming discs 120 in spaced apart fashion to provide an abrupt angle rail direction change, spaced apart at proper distance, depending on rail width utilized on the rail line, to support said wheel set of said rail car.

In FIG. 7, further details for an embodiment of a rail car for use in transport of over-the-road trailers 24 are shown. Here, the pick-up of an over-the-road trailer by a tractor is shown, with the rail car in a lowered, trailer pickup position. In an embodiment, over-the-road trailers may utilize a locking mechanism in the form of a conventional king pin and steel mating plate for connection to a fifth wheel plate and associated clamping jaws on an over-the-road tractor. The clamping jaws snap in place around the king pin, which includes a flanged bottom in conventional fashion to insure that the king pin—and thus the trailer—cannot bounce out of the clamping jaws, for example, when rough roads are encountered. Thus, in an embodiment, a rail car may be provided with a steel mating plate with clamping jaws to lock the over-the-road trailer in securely in place during rail transport. In a method of use, the clamping jaws on the steel mating plate on the L-car may be unlocked once the train reaches the siding, and before the front of the L-car is picked up and turned. Thus, when the L-car is turned, for example as is shown in FIG. 3, the landing gear will support the semi-trailer in position ready for accepting a tractor for hookup.

In the foregoing description, numerous details have been set forth in order to provide a thorough understanding of the disclosed exemplary embodiments for novel L-car designs, and for methods of their use in rail-road intermodal freight systems. However, certain of the described details may not be required in order to provide useful embodiments, or to practice selected or other disclosed embodiments. Further, the description may include, for descriptive purposes, various relative terms such as surface, at, adjacent, proximity, near, on, onto, and the like. Such usage should not be construed as limiting. Terms that are relative only to a point of reference are not meant to be interpreted as absolute limitations, but are instead included in the foregoing description to facilitate understanding of the various aspects of the disclosed embodiments. Various components are described which may be employed alternatively, yet be included in some designs or components for use in a particular situation. Accordingly, the method(s) described herein may be utilized in whole or in part in various discrete operations, in a manner that is most helpful in a particular circumstance. However, the order of description should not be construed as to imply that such alternatives are necessarily order dependent, or that use of various components is necessarily in the alternative. Also, the reader will note that the phrase "in one embodiment" has been used repeatedly. This phrase generally does not refer to the same embodiment; however, it may. Finally, the terms "comprising", "having" and "including" should be considered synonymous, unless the context dictates otherwise.

Various aspects and embodiments described and claimed herein may be modified from those shown without materially departing from the novel teachings and advantages provided by this invention, and may be embodied in other specific forms without departing from the spirit or essential characteristics thereof. Embodiments presented herein are to be considered in all respects as illustrative and not restrictive or limiting. This disclosure is intended to cover methods and apparatus described herein, and not only structural equivalents thereof, but also equivalent structures. Modifications and variations are possible in light of the above teachings. Therefore, the protection afforded to this invention should be limited only by the claims set forth herein, and the legal equivalents thereof.

The invention claimed is:

1. Apparatus for support of an intermodal freight rail car having flanged rail wheels, said apparatus comprising:
   a first straight rail and second straight rail;
   a curved rail section, said curved rail section sized and shaped to curve sharply from said first straight rail, said curved rail section comprising a support surface for supporting one of said flanged rail wheels, said curved rail section further comprising a plurality of pin accepting apertures defined by inner edge portions;
   a plurality of pins;
   a base plate comprising a plurality of pin locating apertures therein; and
   wherein said plurality of pin accepting apertures are adapted for accepting pins therethrough to secure said curved rail section at said pin locating apertures in said base plate;
   a plurality of rail forming tubular cylinders, said rail forming tubular cylinders having pin accepting apertures therein, said rail forming tubular cylinders having a flat surface oriented to support a flanged rail wheel by placement of a plurality of rail forming tubular cylinders above said base plate, wherein said plurality of pin accepting apertures are adapted for accepting pins therethrough to secure said rail forming tubular cylinders at said pin locating apertures in said base plate.

2. Apparatus, comprising:

structure configured to support turning of intermodal freight rail cars, said intermodal freight cars designed for hauling over-the-road trailers, said intermodal freight cars having a pair of flanged rail wheels, said structure including a first straight rail and a second straight rail;

a curved rail section, said curved rail section sized and shaped to curve sharply from said first straight rail, said curved rail section comprising a support surface for supporting a flanged rail wheel in said pair of flanged rail wheels, said curved rail section further comprising a plurality of pin accepting apertures defined by inner edge portions;

a plurality of pins;

a base plate comprising a plurality of pin locating apertures therein, wherein said plurality of pin accepting apertures in said curved rail section are each adapted for accepting one of said plurality of pins therethrough to secure said curved rail section at said pin locating apertures in said base plate;

a plurality of rail forming tubular cylinders, said rail forming tubular cylinders having pin accepting apertures therein, said rail forming tubular cylinders sized and shaped for support of a flanged rail wheel in said pair of flanged rail wheels above said base plate when said pin accepting apertures each accept one of said plurality of pins therethrough and secure said rail forming tubular cylinders to said base plate, and wherein said curved rail section said rail forming tubular cylinders have a flat surfaces oriented and operatively located in a spaced apart fashion to provide support to said pair of flanged rail wheels.

3. Apparatus, comprising:

structure for support of an intermodal freight rail car having a pair flanged rail wheels, said structure including a first straight rail and a second straight rail;

a curved rail section, said curved rail section sized and shaped to curve sharply from said first straight rail, said curved rail section comprising a support surface for supporting flanged rail wheels, said curved rail section further comprising a plurality of pin accepting apertures defined by inner edge portions;

a plurality of pins;

a base plate comprising a plurality of pin locating apertures therein, wherein said plurality of pin accepting apertures in said curved rail section are each adapted for accepting one of said plurality of pins therethrough to secure said curved rail section at said pin locating apertures in said base plate;

a plurality of rail forming tubular cylinders, said rail forming tubular cylinders having pin accepting apertures therein, said tubular cylinders having a flat surface sized and shaped for vertical support of a flanged rail wheel above said base plate when said pin accepting apertures each accept one of said plurality of pins therethrough and secure said tubular cylinders to said base plate, and wherein said curved rail section said rail forming tubular cylinders are operatively located in a spaced apart fashion to provide support to said pair of flanged rail wheels.

4. Apparatus, comprising:

structure sized, shaped, and comprising structural strength adequate to support an intermodal rail freight car during abrupt turning, said intermodal freight rail car having a pair of flanged rail wheels, said structure including a base plate;

a rail pair comprising a first straight rail and a second straight rail;

a curved rail section, said curved rail section sized and shaped to curve sharply from said first straight rail, said curved rail section securely located above said base plate to receive thereon a first flanged rail wheel selected from said pair of flanged rail wheels;

a plurality of rail forming tubular cylinders, each of said plurality of rail forming tubular cylinders secured above said base plate and having a surface sized and shaped for support above said base plate a second flanged rail wheel selected from said pair of flanged rail wheels, and wherein said curved rail section said rail forming tubular cylinders are operatively located in a spaced apart fashion to provide support to said pair of flanged rail wheels.

5. The apparatus as set forth in claim 4, further comprising a plurality of pins, and wherein said rail forming tubular cylinders each have an aperture therein, and wherein one of said plurality of pins is placed through said aperture in one of said rail forming tubular cylinders, so that said rail forming tubular cylinders are operatively fixed to said base plate.

6. The apparatus as set forth in claim 4, further comprising a plurality of pins, and wherein said curved rail sections each further comprise a plurality of pin accepting apertures, said pin accepting apertures each adapted for accepting one of said plurality of pins therethrough, so that said curved rail sections are operatively fixed to said base plate.

* * * * *

UNITED STATES PATENT AND TRADEMARK OFFICE
CERTIFICATE OF CORRECTION

PATENT NO. : 8,800,452 B2  
APPLICATION NO. : 13/679882  
DATED : August 12, 2014  
INVENTOR(S) : David Kun Page 1 of 1

It is certified that error appears in the above-identified patent and that said Letters Patent is hereby corrected as shown below:

IN THE SPECIFICATION:

Column 1, line 55, after the word "combinations", insert --,--.
Column 5, line 9, after the word "using", insert --a--.
Column 5, line 61, after the word "trailer", delete "in".

IN THE CLAIMS:

Column 7, line 31, after the words "rail section", insert --and--.
Column 8, line 12, after the words "rail section", insert --and--.

Signed and Sealed this  
Twenty-ninth Day of September, 2015

Michelle K. Lee  
*Director of the United States Patent and Trademark Office*